United States Patent
Lin et al.

(10) Patent No.: US 10,659,226 B2
(45) Date of Patent: May 19, 2020

(54) DATA ENCRYPTION METHOD, DECRYPTION METHOD, APPARATUS, AND SYSTEM

(71) Applicant: Tencent Technology (Shenzhen) Company Limited, Shenzhen (CN)

(72) Inventors: Luyi Lin, Shenzhen (CN); Yufei Wang, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 131 days.

(21) Appl. No.: 15/698,432

(22) Filed: Sep. 7, 2017

(65) Prior Publication Data

US 2017/0373850 A1    Dec. 28, 2017

Related U.S. Application Data

(63) Continuation-in-part of application No. PCT/CN2016/078480, filed on Apr. 5, 2016.

(30) Foreign Application Priority Data

Aug. 12, 2015    (CN) .......................... 2015 1 0494043

(51) Int. Cl.
*H04L 9/28* (2006.01)
*H04L 29/06* (2006.01)
(Continued)

(52) U.S. Cl.
CPC ................ *H04L 9/30* (2013.01); *H04L 9/088* (2013.01); *H04L 9/0847* (2013.01);
(Continued)

(58) Field of Classification Search
CPC . H04L 2209/80; H04L 63/0428; H04L 63/06; H04L 9/0847; H04L 9/0866; H04L 9/088; H04L 9/30; H04W 12/06
See application file for complete search history.

(56) References Cited

U.S. PATENT DOCUMENTS 5,485,474 A * 1/1996 Rabin ................... G06F 11/004
                                                       714/762
5,825,880 A * 10/1998 Sudia ...................... G06F 21/40
                                                       713/180
(Continued)

FOREIGN PATENT DOCUMENTS

CN    101950347 A    1/2011
CN    102684877 A    9/2012
(Continued)

OTHER PUBLICATIONS

Garay, Juan A., et al. "Secure distributed storage and retrieval." Theoretical Computer Science 243.1-2 (2000): 363-389. (Year: 2000).*

(Continued)

*Primary Examiner* — Michael Simitoski
(74) *Attorney, Agent, or Firm* — Morgan, Lewis & Bockius LLP

(57) ABSTRACT

A data encryption method performed at a computing device includes: receiving a data encryption request, the data encryption request indicating original data that needs to be encrypted and at least two target storage devices that are communicatively connected to the computing device; in response to the data encryption request: separately obtaining unique device information of the at least two target storage devices; generating, based on the unique device information, a public key according to a preset policy; encrypting the original data by using the public key to obtain ciphertext;

(Continued)

and destructing relevant data of the public key from the computing device, and storing the ciphertext into the at least two target storage devices.

13 Claims, 8 Drawing Sheets

(51) Int. Cl.
*G06F 21/62* (2013.01)
*H04L 9/30* (2006.01)
*H04L 9/08* (2006.01)
*H04W 12/06* (2009.01)
*H04W 12/04* (2009.01)

(52) U.S. Cl.
CPC ........ *H04L 9/0866* (2013.01); *H04L 63/0428* (2013.01); *H04L 63/06* (2013.01); *H04W 12/06* (2013.01); *H04L 2209/80* (2013.01)

(56) References Cited

U.S. PATENT DOCUMENTS

| | | | | |
|---|---|---|---|---|
| 6,182,214 | B1* | 1/2001 | Hardjono | H04L 9/085 380/255 |
| 6,986,044 | B1* | 1/2006 | Inada | H04L 9/0822 380/282 |
| 8,464,073 | B2* | 6/2013 | Salessi | G06F 21/31 380/28 |
| 8,744,079 | B2* | 6/2014 | Francis | H04L 9/0866 380/273 |
| 9,483,656 | B2* | 11/2016 | Leggette | G06F 21/6227 |
| 9,514,326 | B1* | 12/2016 | Kroeger | G06F 16/113 |
| 9,667,416 | B1* | 5/2017 | Machani | H04L 9/0822 |
| 9,703,979 | B1* | 7/2017 | Yang | G06F 21/6218 |
| 2003/0081789 | A1* | 5/2003 | Numao | H04L 9/085 380/278 |
| 2003/0088782 | A1* | 5/2003 | Forrest | H04L 9/085 713/186 |
| 2003/0123667 | A1* | 7/2003 | Weber | H04L 9/0866 380/277 |
| 2004/0059938 | A1* | 3/2004 | Hughes | G06F 21/10 726/26 |
| 2004/0073790 | A1 | 4/2004 | Ateniese et al. | |
| 2004/0250073 | A1* | 12/2004 | Cukier | H04L 9/0822 713/171 |
| 2007/0223703 | A1 | 9/2007 | Verma et al. | |
| 2008/0301444 | A1* | 12/2008 | Kim | H04L 63/08 713/169 |
| 2009/0083190 | A1* | 3/2009 | Isshiki | G06Q 20/3829 705/71 |
| 2009/0094251 | A1* | 4/2009 | Gladwin | G06F 11/1092 |
| 2010/0037052 | A1* | 2/2010 | Brener | H04L 9/32 713/168 |
| 2010/0215172 | A1* | 8/2010 | Schneider | H04L 9/085 380/28 |
| 2011/0293093 | A1* | 12/2011 | Sun | H04L 9/0833 380/211 |
| 2012/0155636 | A1* | 6/2012 | Muthaiah | H04L 9/0825 380/44 |
| 2012/0163588 | A1* | 6/2012 | Kobayashi | H04L 9/0847 380/28 |
| 2012/0177198 | A1* | 7/2012 | Cabos | H04L 9/0825 380/270 |
| 2013/0080782 | A1* | 3/2013 | Rajadurai | H04L 63/065 713/171 |
| 2013/0179679 | A1* | 7/2013 | Broustis | H04L 9/0822 713/152 |
| 2013/0182848 | A1* | 7/2013 | Sundaram | H04L 9/0833 380/277 |
| 2014/0129689 | A1* | 5/2014 | Zhao | H04L 12/185 709/221 |
| 2014/0359218 | A1* | 12/2014 | Feng | G06F 3/064 711/114 |
| 2015/0149780 | A1* | 5/2015 | D'Souza | H04L 9/0825 713/171 |
| 2016/0044007 | A1* | 2/2016 | Boudguiga | H04L 9/083 713/171 |
| 2016/0098359 | A1* | 4/2016 | Adkins | H04L 9/0866 713/193 |

FOREIGN PATENT DOCUMENTS

| | | |
|---|---|---|
| CN | 103107889 A | 5/2013 |
| CN | 104732155 A | 6/2015 |
| EP | 2464051 A1 | 6/2012 |
| EP | 2464051 A4 | 5/2013 |
| WO | WO 2012124270 A1 | 9/2012 |

OTHER PUBLICATIONS

Kher, Vishal, and Yongdae Kim. "Securing distributed storage: challenges, techniques, and systems." Proceedings of the 2005 ACM workshop on Storage security and survivability. ACM, 2005. (Year: 2005).*

Tencent Technology, ISRWO, PCT/CN2016/078480, dated Jun. 28, 2016, 8 pgs.

Tencent Technology, IPRP, PCT/CN2016/078480, dated Feb. 13, 2018, 7 pgs.

Katz J., et al., "Predicate Encryption Supporting Disjunctions, Polynomial Equation, and Inner Products", Cryptology Eprint Archive: Report 2007/404, Jul. 8, 2007, retrieved from the Internet: http://eprint.iacr.org/2007/404.pdf.

* cited by examiner

DATA ENCRYPTION METHOD, DECRYPTION METHOD, APPARATUS, AND SYSTEM

RELATED APPLICATION

This application is a continuation-in-part of PCT Patent Application No. PCT/CN2016/078480, entitled "DATA ENCRYPTION METHOD, DECRYPTION METHOD, APPARATUS, AND SYSTEM" filed on Apr. 5, 2016, which claims priority to Chinese Patent Application No. 201510494043.4, filed with the State Intellectual Property Office of the People's Republic of China on Aug. 12, 2015, and entitled "DATA ENCRYPTION METHOD, DECRYPTION METHOD, APPARATUS, AND SYSTEM", both of which are incorporated herein by reference in their entirety.

FIELD OF THE TECHNOLOGY

The present disclosure relates to the field of communications technologies and in particular, to a data encryption method, a decryption method, an apparatus, and a system.

BACKGROUND OF THE DISCLOSURE

With development of communications technologies, data security draws more attention from people. In conventional technology, security of data is usually guaranteed by encrypting the data. For requirements of authentication during decryption, usually, while encrypted data (that is, ciphertext) is stored into a storage device, a key is also stored in a specific form. Therefore, if both the ciphertext and the key are stolen, data leakage is very likely to be caused. Hence, in the prior art, an encryption solution is further provided. In this solution, a single device characteristic, for example, information, such as an International Mobile Equipment Identity (IMEI), of a device, may be used as an encryption means to encrypt data of the present device, so as to prevent information from being leaked in a case in which content of the present device is copied. Because device characteristic information is not stored, no information leakage would be caused even if ciphertext is lost.

During a process of researching and implementing the prior art, it is found by the inventor of the present disclosure that the foregoing solution is only suitable for storage of a single device, but is not suitable for a case in which a plurality of devices shares a piece of ciphertext, and if the devices are lost together, that is, the ciphertext and a key are lost together, information leakage is also caused, and consequently, security of the existing solution is also not high enough.

SUMMARY

Embodiments of the present application provide a data encryption method, a decryption method, an apparatus, and a system, which not only are applicable to common storage of a plurality of devices to improve applicability thereof, but also can improve security thereof.

An embodiment of the present application provides a data encryption method, including:
receiving a data encryption request, the data encryption request indicating original data that needs to be encrypted and at least two target storage devices;
separately obtaining unique device information of the at least two target storage devices;
generating, based on the unique device information, a public key according to a preset policy; and
encrypting the original data by using the public key to obtain ciphertext; and
locally destructing relevant data of the public key, and storing the ciphertext into the at least two target storage devices.

Correspondingly, an embodiment of the present application further provides a data decryption method, including:
receiving a data decryption request, the decryption request indicating ciphertext that needs to be decrypted;
determining target storage devices that store the ciphertext, the ciphertext being stored in at least two target storage devices;
obtaining unique device information of the target storage devices;
generating, based on the unique device information, a public key according to a preset policy; and
decrypting the ciphertext by using the public key to obtain original data.

Correspondingly, an embodiment of the present application further provides a data encryption apparatus, including:
a receiving unit, configured to receive a data encryption request, the data encryption request indicating original data that needs to be encrypted and at least two target storage devices;
an obtaining unit, configured to separately obtain unique device information of the at least two target storage devices;
a generation unit, configured to generate, based on the unique device information, a public key according to a preset policy; and
an encryption unit, configured to encrypt the original data by using the public key to obtain ciphertext; and
a processing unit, configured to locally destruct relevant data of the public key, and store the ciphertext into the at least two target storage devices.

Correspondingly, an embodiment of the present application further provides a data decryption apparatus, including:
a receiving unit, configured to receive a data decryption request, the decryption request indicating ciphertext that needs to be decrypted;
a determining unit, configured to determine target storage devices that store the ciphertext, the ciphertext being stored in at least two target storage devices;
an obtaining unit, configured to obtain unique device information of the target storage devices;
a generation unit, configured to generate, based on the unique device information, a public key according to a preset policy; and
a decryption unit, configured to decrypt the ciphertext by using the public key to obtain original data.

In addition, an embodiment of the present application further provides a data storage system including any data encryption apparatus and any data decryption apparatus that are provided by the embodiments of the present application.

Moreover, an embodiment of the present application provides a storage medium, storing a processor-executable instruction, the processor-executable instruction being used for performing the following operations:
receiving a data encryption request, the data encryption request indicating original data that needs to be encrypted and at least two target storage devices;
separately obtaining unique device information of the at least two target storage devices;
generating, based on the unique device information, a public key according to a preset policy; and encrypting the original data by using the public key to obtain ciphertext; and locally destructing relevant data of the public key, and storing the ciphertext into the at least two target storage devices.

The embodiments of the present application adopts a solution, including: when receiving a data encryption request, obtaining unique device information of at least two target storage devices, then, generating, based on the unique device information, a public key according to a preset policy and encrypting original data by using the public key to obtain ciphertext, and after that, locally destructing relevant data of the public key and storing the ciphertext into the target storage devices. This solution is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and persons skilled in the art may still derive other drawings from these accompanying drawings without creative efforts.

DESCRIPTION OF EMBODIMENTS

The technical solution of the present disclosure will be clearly and completely described in the following with reference to the accompanying drawings. It is obvious that the embodiments to be described are only a part rather than all of the embodiments of the present application. All other embodiments derived by persons skilled in the art from the embodiments of the present application without creative efforts shall fall within the protection scope of the present disclosure.

The embodiments of the present application provide a data encryption method, a decryption method, an apparatus, and a system.

The data storage system may include a computing device for data encryption and data decryption. The data encryption function and the data decryption function may exist as independent entities or may be integrated in a same entity such as a terminal, a server, or another network device. In addition, the data storage system may further include at least two storage devices, for example, referring to a storage device 1, a storage device 2, ..., and a storage device n in FIG. 1A and FIG. 1B. For convenience of description, the data storage system is briefly described separately by using two scenarios, namely, an encryption scenario and a decryption scenario.

Figure 1A:
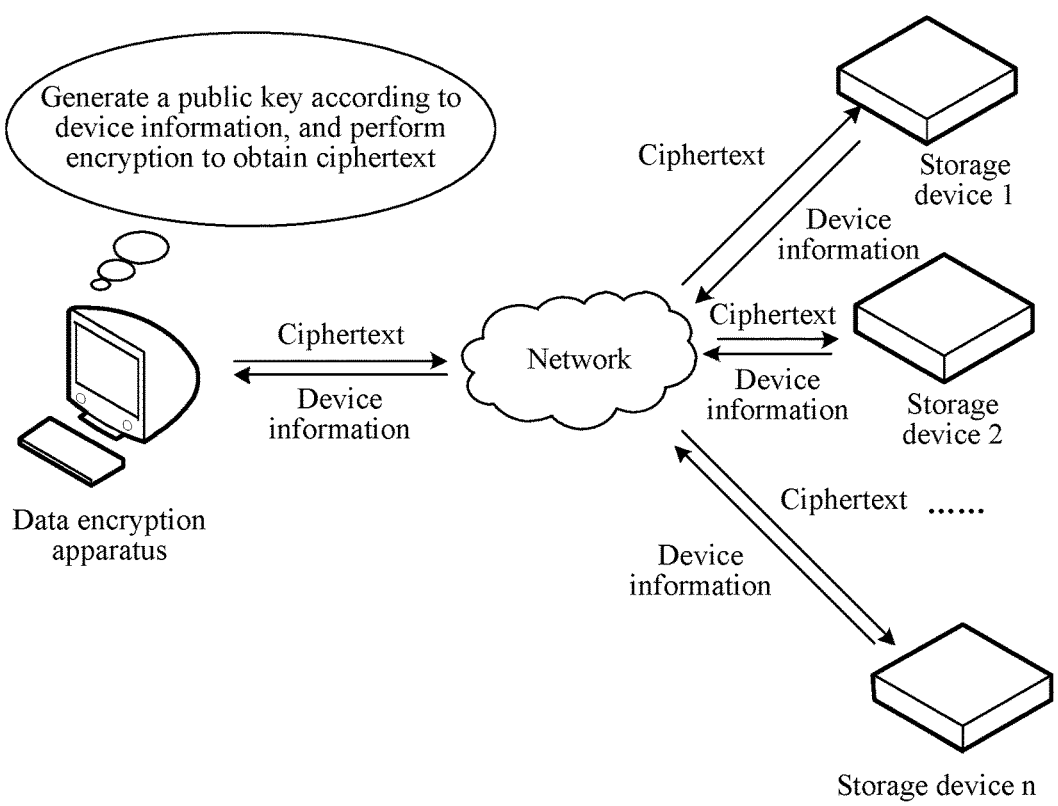
FIG. 1A is a schematic diagram of an encryption scenario in a data storage system according to an embodiment of the present application.

Referring to FIG. 1A, FIG. 1A is a schematic diagram of a scenario of the data storage system during encryption. When specific original data needs to be encrypted, the data encryption apparatus may receive a data encryption request, where the data encryption request indicates the original data that needs to be encrypted and at least two target storage devices, then separately obtains unique device information of the at least two target storage devices and generates, based on the unique device information, a public key according to a preset policy, and after that, can encrypt the original data by using the public key to obtain ciphertext and store the ciphertext into the at least two target storage devices. To prevent the public key from being stolen, relevant data of the public key may be locally destructed.

Figure 1B:
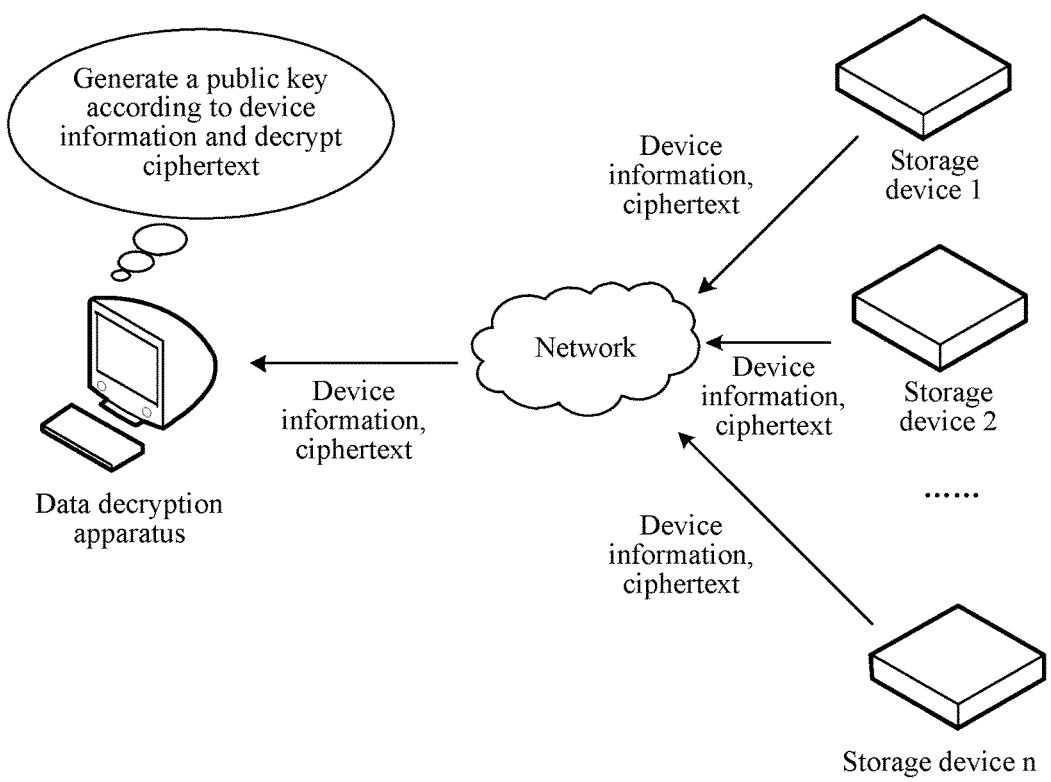
FIG. 1B is a schematic diagram of a decryption scenario in a data storage system according to an embodiment of the present application.

Moreover, during decryption, for example, after a data decryption request is received (where the decryption request indicates ciphertext that needs to be decrypted), target storage devices that store the ciphertext are determined (the ciphertext is stored in at least two target storage devices), then, unique device information of the target storage devices is obtained, and based on the unique device information, a public key is generated according to a preset policy, and after that, the ciphertext may be decrypted by using the public key to obtain original data, referring to FIG. 1B. It should be noted that when the public key is generated, the policy used during the decryption should be consistent with the policy selected during the encryption.

Descriptions are separately provided below in detail.

Embodiment 1

In this embodiment, description is made from the perspective of a data encryption apparatus. The data encryption apparatus may be specifically integrated in various devices such as a terminal, a server, or another network device. The terminal may be specifically a device such as a mobile phone, a tablet computer, a personal computer (PC), or a notebook computer.

A data encryption method includes: receiving a data encryption request, the data encryption request indicating original data that needs to be encrypted and at least two target storage devices; separately obtaining unique device information of the at least two target storage devices; generating, based on the unique device information, a public key according to a preset policy; and encrypting the original data by using the public key to obtain ciphertext; and locally destructing relevant data of the public key, and storing the ciphertext into the at least two target storage devices.

Figure 1C:
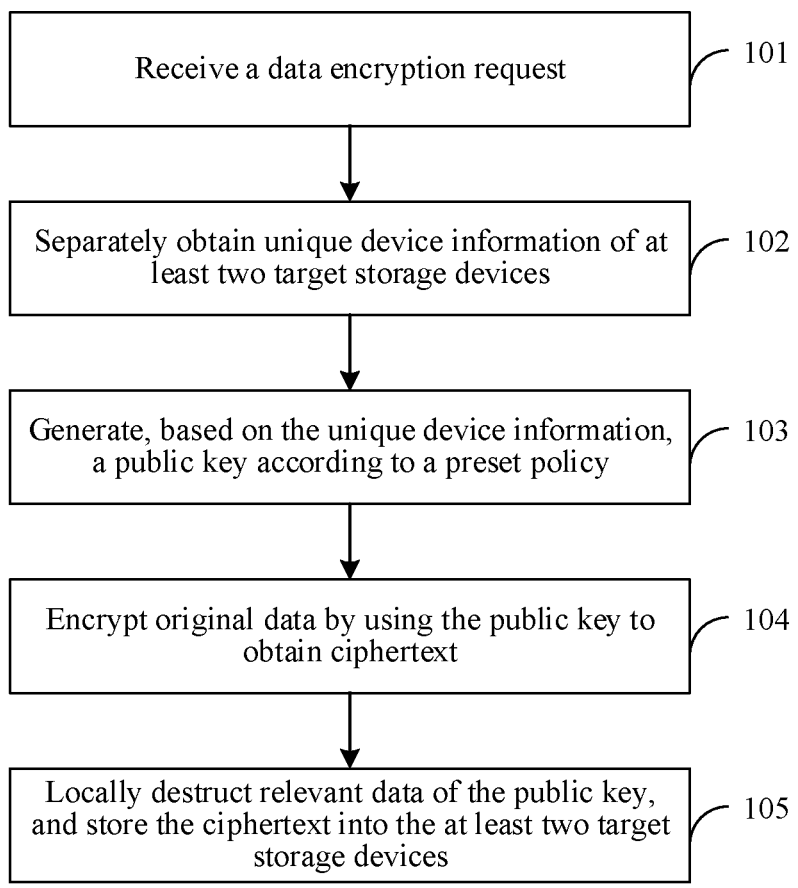
FIG. 1C is a flowchart of a data encryption method according to an embodiment of the present application.

As shown in FIG. 1C, a specific process of the data encryption method may be as follows:

101. Receive a data encryption request.

For example, specifically, a data encryption request triggered by a user may be received. The data encryption request indicates information of original data that needs to be encrypted, at least two target storage devices, and the like. For example, the data encryption request may carry storage locations, such as storage addresses, of the original data that needs to be encrypted, identifiers of storage devices in which ciphertext needs to be stored after the original data is encrypted, and the like.

102. Separately obtain unique device information of the at least two target storage devices. For example, the unique device information of the at least two target storage devices may be obtained separately by means of the Bluetooth, a wireless network, a mobile network, the Internet, or the like.

The unique device information may include information such as a sequence number, an IMEI code, an integrated circuit card identity (ICCID), and/or a mobile equipment identifier (MEID).

The unique device information of the target storage devices may be obtained in various manners. For example, the unique device information of the target storage devices may be viewed and then input by the user. That is, the unique device information of the target storage devices that is directly input by the user is received, or the unique device information may be directly obtained from the target storage device, which may be specifically as follows:

separately send a first device information obtaining request to the at least two target storage devices, and separately receive the unique device information returned by the at least two target storage devices according to the first device information obtaining request.

For example, in an example in which the target storage devices are specifically a storage device A and a storage device B, a first device information obtaining request may be sent to the storage device A and unique device information of the storage device A returned by the storage device A is received; and a first device information obtaining request may be sent to the storage device B and the unique device information of the storage device B returned by the storage device B is received, and so on.

Optionally, to improve security, authentication may be performed on a right of a requester. That is, the step "separately obtaining unique device information of the at least two target storage devices" may also be specifically as follows:

separately sending a second device information obtaining request to the at least two target storage devices, where the second device information obtaining request carries authentication information, and separately receiving the unique device information returned by the at least two target storage devices, where the unique device information is returned by the target storage devices when the target storage devices perform authentication on the second device information obtaining request and determine that the authentication succeeds.

For example, in an example in which the target storage devices are still specifically a storage device A and a storage device B, a second device information obtaining request may be sent to the storage device A, the storage device A performs authentication according to authentication information and returns unique device information of the storage device A when the authentication succeed; and similarly, after a second device information obtaining request carrying authentication information is sent to the storage device B, the storage device B performs authentication according to authentication information and returns unique device information of the storage device B when the authentication succeed, and so on. It should be noted that if the authentication fails, the unique device information of the target storage devices is refused to be provided and at this moment, the target storage devices may also return a failure reason, for example, a prompt such as "Authentication fails, and correct authentication information needs to be provided", to the data encryption apparatus, and so on. Details are not described herein again.

103. Generate, based on the unique device information, a public key according to a preset policy.

The key is a parameter input into an algorithm that converts plaintext to ciphertext or converts ciphertext to plaintext.

The policy may be set according to requirements of actual application, for example, may be set in any one of the following manners:

(1) Combine the unique device information according to a preset first sequence to obtain the public key.

For example, in an example in which unique device information is an IMEI code of a device, if the first target storage device is a storage device A, the second target storage device is a storage device B, and the third target storage device is a storage device C, an IMEI code "000000000000001" of the storage device A, an IMEI code "000000000000002" of the storage device B, and an IMEI code "000000000000003" of the storage device C may be combined according to a preset first sequence, for example, in sequential order, to obtain a public key, that is, "000000000000001000000000000002000000000000003".

(2) Separately extract the unique device information according to a preset extraction rule to obtain extracted information, and combine the extracted information according to a preset second sequence to obtain the public key.

For example, in an example in which unique device information is still an IMEI code of a device, if the first target storage device is a storage device A, the second target storage device is a storage device B, the third target storage device is a storage device C, and an extraction rule is extracting last four digits of an IMEI code, an IMEI code "000000000000001" of the storage device A, an IMEI code "000000000000002" of the storage device B, and an IMEI code "000000000000003" of the storage device C may be separately extracted to obtain extracted information "0001", "0002", and "0003", and then the extracted information is combined according to a preset second sequence, for example, in sequential order, to obtain a public key, that is, "000100020003".

(3) Separately calculate the unique device information according to a preset first algorithm to obtain calculated information, and combine the calculated information according to a preset third sequence to obtain the public key.

For example, a weighted operation or specific function conversion may be performed on the unique device information to obtain calculated information, and then, the calculated information is combined to obtain a public key. A combination manner is similar to those in the manners (1) and (2), and details are not described herein again.

(4) Combine the unique device information according to a preset fourth sequence to obtain combined information and calculate the combined information according to a preset second algorithm to obtain the public key.

The unique device information not only can be calculated first and then combined, but also can be combined first and then calculated. Execution of the manner (4) is similar to execution of the manner (3), and details are not described herein again.

The first sequence, the second sequence, the third sequence, the fourth sequence, the preset first algorithm, the preset second algorithm, the preset extraction rule, and the like may be set according to requirements of actual application, and details are not further described herein.

104. Encrypt the original data by using the public key to obtain ciphertext.

For example, specifically, an encryption process may be invoked, the encryption process is executed, and the original data is encrypted by using the public key to obtain ciphertext.

105. Locally destruct relevant data of the public key, and store the ciphertext into the at least two target storage devices.

The relevant data of the public key is relevant information of the public key that may be leaked such as the public key and the unique device information used for generating the public key. Therefore, after the original data is encrypted by using the public key, the public key does not need to be stored, and the obtained unique device information (that is, the unique device information used for generating the public key) may be locally deleted. In this way, basically, even if local data leaks, a stealer cannot know the public key.

In addition, when the ciphertext is stored into the target storage devices, because there is a plurality of target storage devices, there are also various storage manners. For example, the ciphertext is divided into several segments, and then, the segments are respectively stored into the target storage devices. That is, only when the all of the ciphertext segments in the target storage device are combined together, the entire ciphertext can be obtained. Alternatively, the entire ciphertext may be stored in each target storage device. That is, the step "storing the ciphertext into the at least two target storage devices" may be specifically as follows:

dividing, according to a quantity of the target storage devices, the ciphertext into a corresponding quantity of ciphertext segments, and storing each of the ciphertext segments into a corresponding target storage device; or separately sending the entire ciphertext to the at least two target storage devices to store the entire ciphertext.

It could be known from the above that the embodiments of the present application adopts a solution, including: when receiving a data encryption request, obtaining unique device information of at least two target storage devices, then, generating, based on the unique device information, a public key according to a preset policy and encrypting original data by using the public key to obtain ciphertext, and after that, locally destructing relevant data of the public key and storing the ciphertext into the target storage devices. This solution is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

Embodiment 2

In correspondence to the data encryption method, the embodiments of the present application further correspondingly provide a data decryption method. In this embodiment, detailed description is made.

Description is made from the perspective of a data decryption apparatus. The data decryption apparatus may be specifically integrated in various devices such as a terminal, a server, or another network device. The data decryption apparatus and the data encryption apparatus may be respectively implemented as independent entities or may be implemented as a same entity.

A data decryption method includes: receiving a data decryption request, the decryption request indicating ciphertext that needs to be decrypted; determining target storage devices that store the ciphertext, the ciphertext being stored in at least two target storage devices; obtaining unique device information of the target storage devices; generating, based on the unique device information, a public key according to a preset policy; and decrypting the ciphertext by using the public key to obtain original data.

Figure 2:
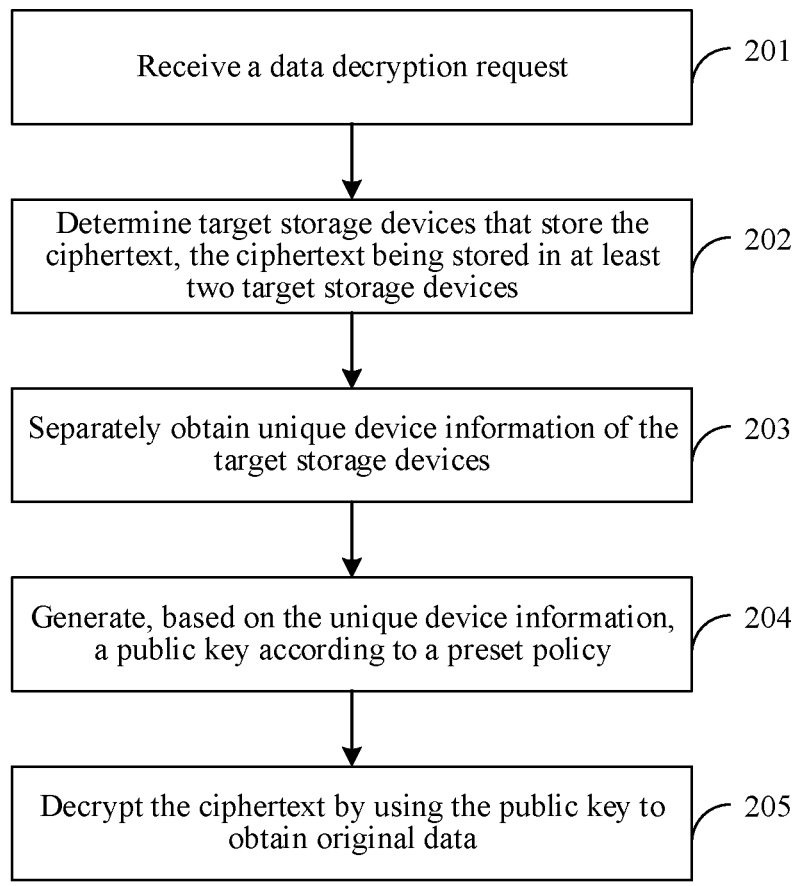
FIG. 2 is a flowchart of a data decryption method according to an embodiment of the present application.

As shown in FIG. 2, a specific process of the data decryption method may be as follows:

201. Receive a data decryption request.

For example, specifically, a data decryption request triggered by a user may be received. The data decryption request indicates information such as ciphertext that needs to be decrypted. For example, the data decryption request may carry storage addresses of the ciphertext or other information that may indicate storage locations of the ciphertext, and the like.

202. Determine target storage devices that store the ciphertext, the ciphertext being stored in at least two target storage devices.

If during encryption, the ciphertext is stored in a storage device A and a storage device B, storage addresses of the ciphertext may be carried in the data decryption request. In this way, it could be determined according to the storage addresses that the target storage devices of the ciphertext are the storage device A and the storage device B. Alternatively, if identifiers of a storage device A and a storage device B are carried in the data decryption request, it could be determined directly according to the identifiers of the storage device A and the storage device B that the target storage devices of the ciphertext are the storage device A and the storage device B, and so on. No example is further provided herein.

203. Separately obtain unique device information of the target storage devices. For example, the unique device information of the target storage devices may be obtained separately by means of the Bluetooth, a wireless network, a mobile network, the Internet, or the like.

The unique device information may include information such as a sequence number, an IMEI code, an ICCID code, and/or a MEID code.

The unique device information of the target storage devices may be obtained in various manners. For example, the unique device information of the target storage devices may be viewed and then input by the user. That is, the unique device information of the target storage devices that is directly input by the user is received, or the unique device information may be directly obtained from the target storage device, which may be specifically as follows:

separately sending a first device information obtaining request to the target storage devices, and separately receiving the unique device information returned by the target storage devices according to the first device information obtaining request.

For example, in an example in which the target storage devices are specifically a storage device A and a storage device B, a first device information obtaining request may be sent to the storage device A and unique device information of the storage device A returned by the storage device A is received; and a first device information obtaining request may be sent to the storage device B and unique device information of the storage device A returned by the storage device B is received, and so on.

Optionally, to improve security, authentication may be performed on a right of a requester. That is, the step "separately obtaining unique device information of the at least two target storage devices" may also be specifically as follows:

separately sending a second device information obtaining request to the target storage devices, where the second device information obtaining request carries authentication information, and separately receiving the unique device information returned by the target storage devices, where the unique device information is returned by the target storage devices when the target storage devices perform authentication on the second device information obtaining request and determine that the authentication succeeds.

For example, in an example in which the target storage devices are still specifically a storage device A and a storage device B, a second device information obtaining request may be sent to the storage device A, the storage device A performs authentication according to authentication information and returns unique device information of the storage device A when the authentication succeed; and similarly, after a second device information obtaining request carrying authentication information is sent to the storage device B, the storage device B performs authentication according to authentication information and returns unique device information of the storage device B when the authentication succeed, and so on. It should be noted that if the authentication fails, the unique device information of the target storage devices is refused to be provided and at this moment, the target storage devices may also return a failure reason, for example, a prompt such as "Authentication fails, and correct authentication information needs to be provided", to the data encryption apparatus, and so on. Details are not described herein again.

204. Generate, based on the unique device information, a public key according to a preset policy.

The policy may be set according to requirements of actual application, for example, may be set in any one of the following manners:

(1) Combine the unique device information according to a preset first sequence to obtain the public key.

For example, in an example in which unique device information is an IMEI code of a device, if the first target storage device is a storage device A, the second target storage device is a storage device B, and the third target storage device is a storage device C, an IMEI code "000000000000001" of the storage device A, an IMEI code "000000000000002" of the storage device B, and an IMEI code "000000000000003" of the storage device C may be combined according to a preset first sequence, for example, in sequential order, to obtain a public key, that is, "000000000000001000000000000002000000000000003".

(2) Separately extract the unique device information according to a preset extraction rule to obtain extracted information, and combine the extracted information according to a preset second sequence to obtain the public key.

For example, in an example in which unique device information is still an IMEI code of a device, if the first target storage device is a storage device A, the second target storage device is a storage device B, the third target storage device is a storage device C, and an extraction rule is extracting last four digits of an IMEI code, an IMEI code "000000000000001" of the storage device A, an IMEI code "000000000000002" of the storage device B, and an IMEI code "000000000000003" of the storage device C may be separately extracted to obtain extracted information "0001", "0002", and "0003", and then the extracted information is combined according to a preset second sequence, for example, in sequential order, to obtain a public key, that is, "000100020003".

(3) Separately calculate the unique device information according to a preset first algorithm to obtain calculated information, and combine the calculated information according to a preset third sequence to obtain the public key.

For example, a weighted operation or specific function conversion may be performed on the unique device information to obtain calculated information, and then, the calculated information is combined to obtain a public key. A combination manner is similar to those in the manners (1) and (2), and details are not described herein again.

(4) Combine the unique device information according to a preset fourth sequence to obtain combined information and calculate the combined information according to a preset second algorithm to obtain the public key.

The unique device information not only can be calculated first and then combined, but also can be combined first and then calculated. Execution of the manner (4) is similar to execution of the manner (3), and details are not described herein again.

The first sequence, the second sequence, the third sequence, the fourth sequence, the preset first algorithm, the preset second algorithm, the preset extraction rule, and the like may be set according to requirements of actual application, and details are not further described herein.

It should be noted that the policy used during the decryption should be consistent with the policy selected during the encryption.

Optionally, the policy used during the decryption may be agreed on by the data encryption apparatus and the data decryption apparatus in advance, and is set separately in the data encryption apparatus and the data decryption apparatus, or may be agreed on by the data encryption apparatus and the data decryption apparatus in advance, but is not set, and when needed, is obtained according to an agreement. That is, before the step "generating, based on the unique device information, a public key according to a preset policy (that is, step 204)", the data decryption method may further include:

obtaining a public key generation policy that is used during encryption.

Then, the step "generating, based on the unique device information, a public key according to a preset policy (that is, step 204)" is specifically: generating, based on the unique device information, a public key according to the obtained public key generation policy that is used during encryption.

205. Decrypt the ciphertext by using the public key to obtain original data.

For example, specifically, a decryption process may be invoked, the decryption process is executed, and the ciphertext is decrypted by using the public key to obtain original data.

Optionally, to improve security, after the ciphertext is decrypted by using the public key, relevant data of the public key may be locally destructed. The relevant data of the public key is relevant information of the public key that may be leaked such as the public key and the unique device information used for generating the public key. That is, the obtained unique device information (that is, the unique device information used for generating the public key) may be locally deleted.

In addition, to ensure data security, after obtaining the original data, the user may further delete the original data. Details are not described herein again.

It could be known from the above that the embodiments of the present application adopts a solution, including: when receiving a data decryption request, determining target storage devices that store the ciphertext, where the ciphertext is stored in at least two target storage devices, then obtaining unique device information of the target storage devices, and generating, based on the unique device information, a public key according to a preset policy, and decrypting the ciphertext by using the public key to obtain original data. This solution is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

Embodiment 3

According to the methods described in Embodiments 1 and 2, examples are provided below for further detailed description.

In this embodiment, a data encryption apparatus and a data decryption apparatus are both integrated in a same terminal, and a policy of generating a public key is described by using an example of "combining the unique device information according to a preset first sequence".

(I) Encryption

Figure 3A:
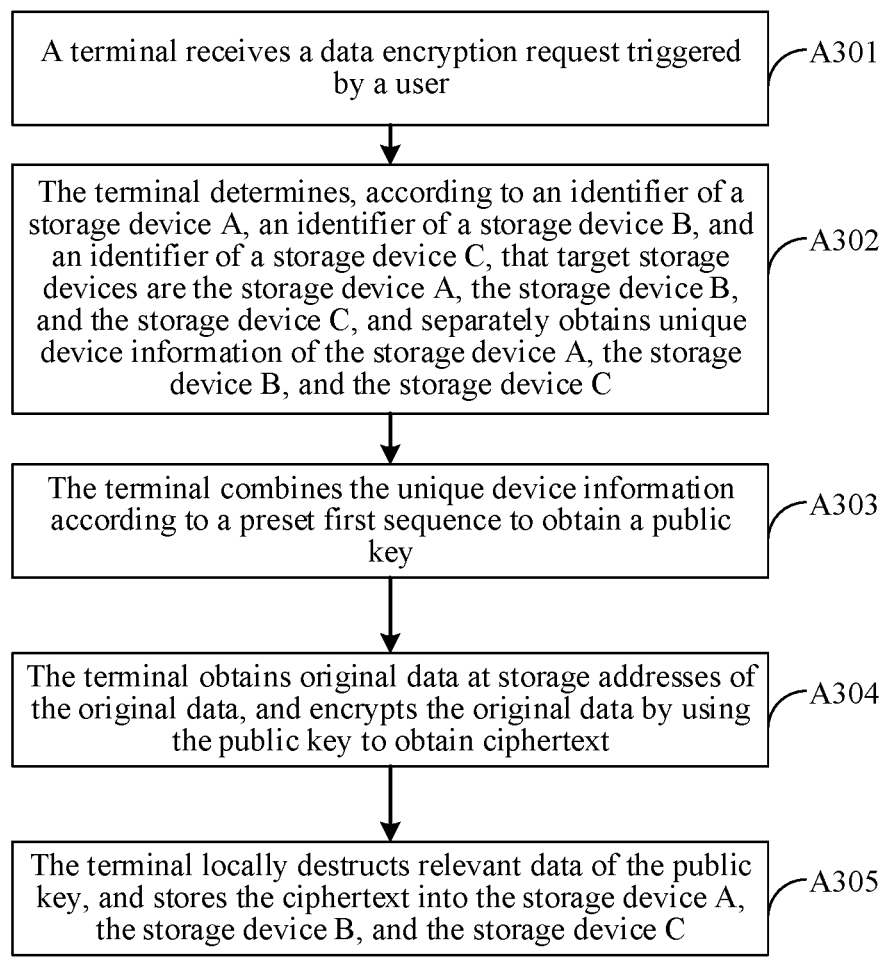
FIG. 3A is another flowchart of a data encryption method according to an embodiment of the present application.

As shown in FIG. 3A, a specific process of a data encryption method may be as follows:

A301. A terminal receives a data encryption request triggered by a user.

The data encryption request indicates information of original data that needs to be encrypted, at least two target storage devices, and the like. For example, the data encryption request may carry storage locations, such as storage addresses, of the original data that needs to be encrypted, identifiers of storage devices in which ciphertext needs to be stored after the original data is encrypted, and the like.

For convenience of description, in this embodiment, an example, in which the data encryption request carries storage addresses of original data that needs to be encrypted and carries an identifier of a storage device A, and an identifier of a storage device B, and an identifier of a storage device C, is used for description.

A302. The terminal determines, according to an identifier of a storage device A, an identifier of a storage device B, and an identifier of a storage device C, that target storage devices are the storage device A, the storage device B, and the storage device C, and separately obtains unique device information of the storage device A, unique device information of the storage device B, and unique device information of the storage device C, for example, separately obtain the unique device information by means of the Bluetooth, a wireless network, a mobile network, the Internet, or the like.

The unique device information may include information such as a sequence number, an IMEI code, an ICCID, and/or a MEID.

The unique device information of the target storage devices may be obtained in various manners. For example, the unique device information of the target storage devices may be viewed and then input by the user. That is, the unique device information of the target storage devices that is directly input by the user is received, or the unique device information may be directly obtained from the target storage device, which may be specifically as follows:

separately sending a first device information obtaining request to the storage device A, the storage device B, and the storage device C, where after receiving the first device information obtaining request, the storage device A, the storage device B, and the storage device C separately return their unique device information to the terminal.

Optionally, to improve security, authentication may be further performed on a right of a requester, which is also specifically as follows:

separately sending a second device information obtaining request to the storage device A, the storage device B, and the storage device C, where the second device information obtaining request carries authentication information, so that after receiving the second device information obtaining request the storage device A, the storage device B, and the storage device C may determine, according to the authentication information, whether the terminal has a right to obtain the unique device information, and if the terminal has the right, return their unique device information to the terminal, for example, the storage device A returns the unique device information of the storage device A, the storage device B returns the unique device information of the storage device B, the storage device C returns the unique device information of the storage device C, and the like.

It should be noted that if the authentication fails, that is, it is determined that the terminal does not have a right to obtain the unique device information, the target storage devices may refuse to provide their unique device information, and at this moment, may also return a failure reason, for example, a prompt such as "Authentication fails, and correct authentication information needs to be provided", to the terminal, and so on. Details are not described herein again.

A303. The terminal combines the unique device information according to a preset first sequence to obtain a public key.

The first sequence may be set according to requirements of actual application. For example, if the first sequence is performing combination in sequence according to a sequential order of the storage devices, for details of the public key, refer to Table 1.

TABLE 1

| Public key | | |
| --- | --- | --- |
| Device information of storage device A | Device information of storage device B | Device information of storage device C |

For example, in an example in which unique device information is an IMEI code of a device, an IMEI code "000000000000001" of the storage device A, an IMEI code "000000000000002" of the storage device B, and an IMEI code "000000000000003" of the storage device C may be combined according to a preset first sequence, for example, in sequential order, to obtain a public key, that is:

"000000000000001000000000000002000000000000003".

It should be noted that another policy may also be used, and implementation thereof is similar that of the present policy. Details are not described herein again.

A304. The terminal obtains original data at storage addresses of the original data that needs to be encrypted, and encrypts the original data by using the public key to obtain ciphertext.

For example, after the original data is obtained, an encryption process may be invoked, the encryption process is executed, and the original data is encrypted by using the public key to obtain ciphertext.

A305. The terminal locally (that is, on the terminal) destructs relevant data of the public key, and stores the ciphertext into the storage device A, the storage device B, and the storage device C.

The relevant data of the public key is relevant information of the public key that may be leaked such as the public key and the unique device information used for generating the public key. Therefore, after the original data is encrypted by using the public key, the public key does not need to be stored, and the obtained unique device information (that is, the unique device information used for generating the public key) may be locally deleted. In this way, basically, even if local data leaks, a stealer cannot know the public key.

In addition, when the ciphertext is stored into the target storage devices, because there is a plurality of target storage devices, there are also various storage manners. For example, the ciphertext is divided into several segments, and then, the segments are respectively stored into the target storage devices. That is, only when the all of the ciphertext segments in the target storage device are combined together, the entire ciphertext can be obtained. Alternatively, the entire ciphertext may be stored in each target storage device. For example, the entire ciphertext may be separately stored in all of the storage device A, the storage device B, and the storage device C, and so on.

(II) Decryption

Figure 3B:
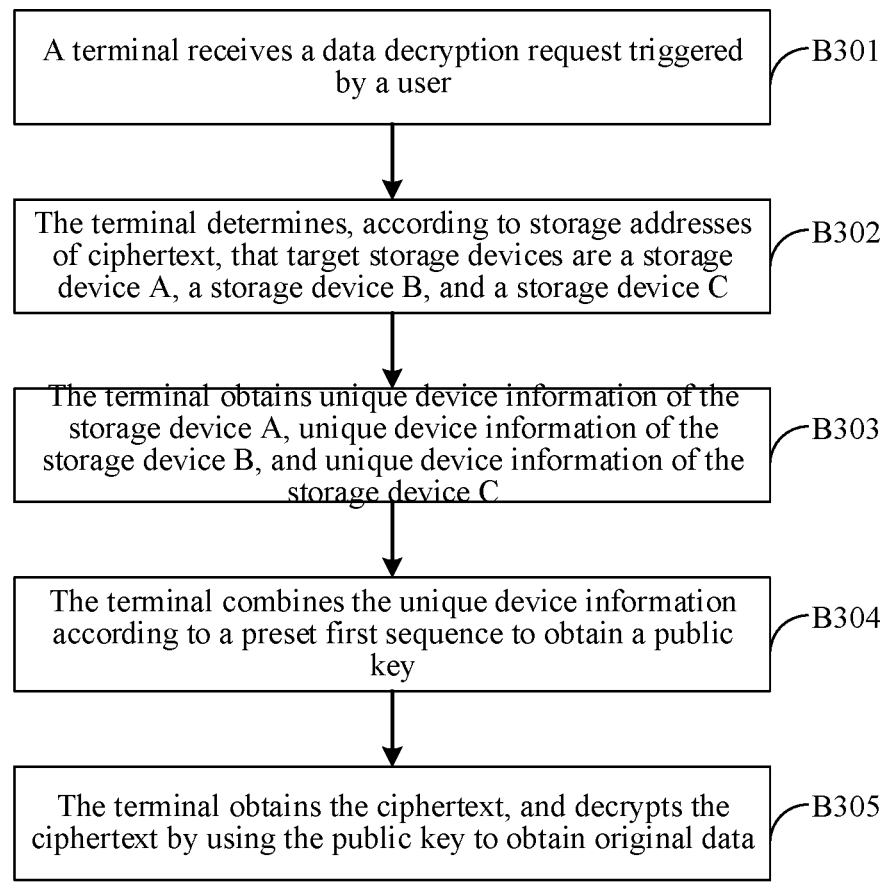
FIG. 3B is another flowchart of a data decryption method according to an embodiment of the present application.

In correspondence to the encryption process of (I), as shown in FIG. 3B, a specific process of a data decryption method may be as follows:

B301. A terminal receives a data decryption request triggered by a user.

The data decryption request indicates information such as ciphertext that needs to be decrypted. For example, the data decryption request may carry storage addresses of the ciphertext or other information that may indicate storage locations of the ciphertext, and the like.

For convenience of description, in this embodiment, an example, in which the data decryption request carries storage addresses of the ciphertext, is used for description.

B302. The terminal determines target storage devices according to storage addresses of the ciphertext. For example, if the ciphertext is stored in a storage device A, a storage device B, and a storage device C during encryption, it could be determined that the target storage devices are the storage device A, the storage device B, and the storage device C.

B303. The terminal obtains unique device information of the storage device A, unique device information of the storage device B, and unique device information of the storage device C. For example, the unique device information may be separately obtained by means of the Bluetooth, a wireless network, a mobile network, the Internet, or the like.

The unique device information may include information such as a sequence number, an IMEI code, an ICCID, and/or a MEID.

The unique device information of the target storage devices may be obtained in various manners. For details, refer to the foregoing embodiments. In addition, optionally, to improve security, authentication may be further performed on whether a requester has a right to obtain the unique device information. For details, refer to the foregoing embodiments. The details are not described herein again.

B304. The terminal combines the unique device information according to a preset first sequence to obtain a public key.

The first sequence may be set according to requirements of actual application. For example, if the first sequence is performing combination in sequence according to a sequential order of the storage devices, for details of the public key, refer to Table 1.

For example, in an example in which unique device information is an IMEI code of a device, an IMEI code "000000000000001" of the storage device A, an IMEI code "000000000000002" of the storage device B, and an IMEI code "000000000000003" of the storage device C may be combined according to a preset first sequence, for example, in sequential order, to obtain a public key, that is: "000000000000001000000000000002000000000000003".

It should be noted that the policy for generating a public key during the decryption should be consistent with the policy used during the encryption.

B305. The terminal obtains the ciphertext from the storage device A, the storage device B, and the storage device C, and decrypts the ciphertext by using the public key to obtain original data.

For example, after the ciphertext is obtained, a decryption process may be invoked, the decryption process is executed, and the ciphertext is decrypted by using the public key to obtain original data.

Optionally, to improve security, after the ciphertext is decrypted by using the public key, relevant data of the public key may be locally (that is, the terminal) destructed. The relevant data of the public key is relevant information of the public key that may be leaked such as the public key and the unique device information used for generating the public key. That is, the obtained unique device information (that is, the unique device information used for generating the public key) may be locally deleted.

In addition, to ensure data security, after obtaining the original data, the user may further delete the original data from the terminal. Details are not described herein again.

It could be known from the above that the terminal used in this embodiment may obtain unique device information of at least two target storage devices when receiving a data encryption request, then, generate, based on the unique device information, a public key according to a preset policy and encrypt original data by using the public key to obtain ciphertext, and after that, locally destruct relevant data of the public key and store the ciphertext into the target storage devices. In addition, this embodiment also provides a corresponding decryption method. The solution provided in this embodiment is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

Embodiment 4

Figure 4:
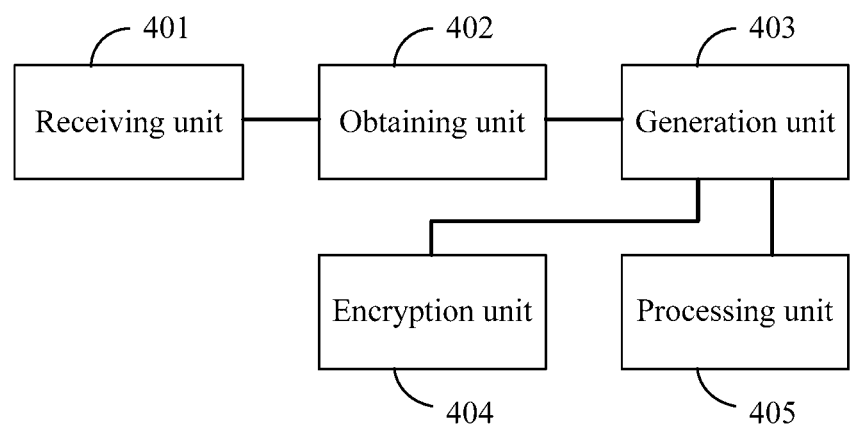
FIG. 4 is a schematic structural diagram of a data encryption apparatus according to an embodiment of the present application.

To implement the foregoing method better, the embodiments of the present application further provide a data encryption apparatus, and as shown in FIG. 4, the data encryption apparatus includes a receiving unit 401, an obtaining unit 402, a generation unit 403, an encryption unit 404, and a processing unit 405 as follows:

(1) The Receiving Unit 401

The receiving unit 401 is configured to receive a data encryption request.

For example, the receiving unit 401 may specifically receive a data encryption request triggered by a user.

The data encryption request indicates information of original data that needs to be encrypted, at least two target storage devices, and the like. For example, the data encryption request may carry storage locations, such as storage addresses, of the original data that needs to be encrypted, identifiers of storage devices in which ciphertext needs to be stored after the original data is encrypted, and the like.

(2) The Obtaining Unit 402

The obtaining unit 402 is configured to separately obtain unique device information of the at least two target storage devices.

For example, the unique device information may be obtained separately by means of the Bluetooth, a wireless network, a mobile network, the Internet, or the like.

The unique device information may include information such as a sequence number, an IMEI code, an ICCID code, and/or a MEID code.

The unique device information of the target storage devices may be obtained in various manners. For example, the unique device information of the target storage devices may be viewed and then input by the user. That is, the unique device information of the target storage devices that is directly input by the user is received, or the unique device information may be directly obtained from the target storage device, that is:

the obtaining unit 402 may be specifically configured to separately send a first device information obtaining request to the at least two target storage devices, and separately receive the unique device information returned by the at least two target storage devices according to the first device information obtaining request.

Optionally, to improve security, authentication may be further performed on a right of a requester, that is:

the obtaining unit 402 may be specifically configured to separately send a second device information obtaining request to the at least two target storage devices, where the second device information obtaining request carries authentication information, and separately receive the unique device information returned by the at least two target storage devices, where the unique device information is returned by the target storage devices when the target storage devices perform authentication on the second device information obtaining request and determine that the authentication succeeds.

(3) The Generation Unit 403

The generation unit 403 is configured to generate, based on the unique device information, a public key according to a preset policy.

The policy may be set according to requirements of actual application, for example, may be set in any one of the following manners:

The generation unit 403 may be specifically configured to combine the unique device information according to a preset first sequence to obtain the public key.

Alternatively, the generation unit 403 may be specifically configured to separately extract the unique device information according to a preset extraction rule to obtain extracted information, and combine the extracted information according to a preset second sequence to obtain the public key.

Alternatively, the generation unit 403 may be specifically configured to separately calculate the unique device information according to a preset first algorithm to obtain calculated information, and combine the calculated information according to a preset third sequence to obtain the public key.

Alternatively, the generation unit 403 may be specifically configured to combine the unique device information according to a preset fourth sequence to obtain combined information and calculate the combined information according to a preset second algorithm to obtain the public key.

The first sequence, the second sequence, the third sequence, the fourth sequence, the preset first algorithm, the preset second algorithm, the preset extraction rule, and the like may be set according to requirements of actual application, and details are not further described herein.

(4) The Encryption Unit 404

The encryption unit 404 is configured to encrypt the original data by using the public key to obtain ciphertext.

For example, the encryption unit 404 may obtain original data according to a data encryption request and encrypt the original data by using the public key to obtain ciphertext, and for example, may invoke an encryption process, execute the encryption process, and then, encrypt the original data by using the public key to obtain ciphertext.

(5) The Processing Unit 405

The processing unit 405 is configured to locally destruct relevant data of the public key, and store the ciphertext into the at least two target storage devices.

The relevant data of the public key is relevant information of the public key that may be leaked such as the public key and the unique device information used for generating the public key. Therefore, after the original data is encrypted by using the public key, the public key does not need to be stored, and the obtained unique device information (that is, the unique device information used for generating the public key) may be locally deleted. In this way, basically, even if local data leaks, a stealer cannot know the public key.

In addition, when the ciphertext is stored into the target storage devices, because there is a plurality of target storage devices, there are also various storage manners. For example, the ciphertext is divided into several segments, and then, the segments are respectively stored into the target storage devices. That is, only when the all of the ciphertext segments in the target storage device are combined together, the entire ciphertext can be obtained. Alternatively, the entire ciphertext may be stored in each target storage device, that is:

the processing unit 405 may be specifically configured to divide, according to a quantity of the target storage devices, the ciphertext into a corresponding quantity of ciphertext segments, and respectively store the ciphertext segments into the target storage devices; or the processing unit may be specifically configured to separately send the entire ciphertext to the at least two target storage devices to store the entire ciphertext.

During specific implementation, the foregoing units may be implemented as independent entities or may be randomly combined to be implemented as one or several entities. For specific implementations of the foregoing units, refer to the foregoing method embodiments. Details are not described herein again.

It could be known from the above that this embodiment adopts a solution, in which when a data encryption request is received, the obtaining unit 402 obtains unique device information of at least two target storage devices, then, the generation unit 403 generates, based on the unique device information, a public key according to a preset policy, and the encryption unit 404 encrypts original data by using the public key to obtain ciphertext, and after that, the processing unit 405 locally destructs relevant data of the public key and stores the ciphertext into the target storage devices. This solution is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

Embodiment 5

Figure 5:
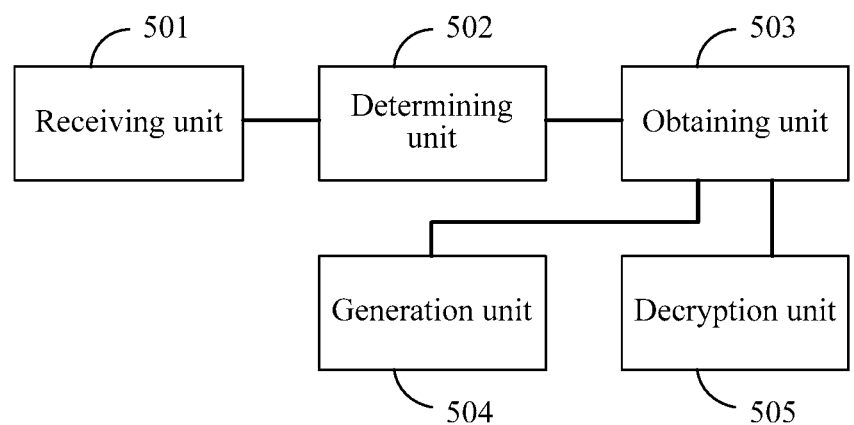
FIG. 5 is a schematic structural diagram of a data decryption apparatus according to an embodiment of the present application.

Correspondingly, the embodiments of the present application further provide a data decryption apparatus, and as shown in FIG. 5, the data decryption apparatus includes a receiving unit 501, a determining unit 502, an obtaining unit 503, a generation unit 504, and a decryption unit 505 as follows:

(1) The Receiving Unit 501

The receiving unit 501 is configured to receive a data decryption request, the decryption request indicating ciphertext that needs to be decrypted.

For example, the receiving unit 501 may specifically receive a data decryption request triggered by a user.

The data decryption request indicates information such as ciphertext that needs to be decrypted. For example, the data decryption request may carry storage addresses of the ciphertext or other information that may indicate storage locations of the ciphertext, and the like.

(2) The Determining Unit 502

The determining unit 502 is configured to determine target storage devices that store the ciphertext, the ciphertext being stored in at least two target storage devices.

If during encryption, the ciphertext is stored in a storage device A and a storage device B, storage addresses of the ciphertext may be carried in the data decryption request. In this way, it could be determined according to the storage addresses that the target storage devices of the ciphertext are the storage device A and the storage device B. Alternatively, if identifiers of a storage device A and a storage device B are carried in the data decryption request, it could be determined directly according to the identifiers of the storage device A and the storage device B that the target storage devices of the ciphertext are the storage device A and the storage device B, and so on. No example is further provided herein.

(3) The Obtaining Unit 503

The obtaining unit 503 is configured to obtain unique device information of the target storage devices.

For example, the unique device information may be obtained separately by means of the Bluetooth, a wireless network, a mobile network, the Internet, or the like.

The unique device information may include information such as a sequence number, an IMEI code, an ICCID code, and/or a MEID code.

The unique device information of the target storage devices may be obtained in various manners. For example, the unique device information of the target storage devices may be viewed and then input by the user. That is, the unique device information of the target storage devices that is directly input by the user is received, or the unique device information may be directly obtained from the target storage device, that is:

the obtaining unit 503 may be specifically configured to separately send a first device information obtaining request to the target storage devices, and separately receive the unique device information returned by the target storage devices according to the first device information obtaining request.

Optionally, to improve security, authentication may be further performed on a right of a requester, that is:

the obtaining unit 503 may be specifically configured to separately send a second device information obtaining request to the target storage devices, where the second device information obtaining request carries authentication information, and separately receive the unique device information returned by the target storage devices, where the unique device information is returned by the target storage devices when the target storage devices perform authentication on the second device information obtaining request and determine that the authentication succeeds.

(4) The Generation Unit 504

The generation unit 504 is configured to generate, based on the unique device information, a public key according to a preset policy.

The policy may be set according to requirements of actual application, for example, may be set in any one of the following manners:

The generation unit 504 may be specifically configured to combine the unique device information according to a preset first sequence to obtain the public key.

Alternatively, the generation unit 504 may be specifically configured to separately extract the unique device information according to a preset extraction rule to obtain extracted information, and combine the extracted information according to a preset second sequence to obtain the public key.

Alternatively, the generation unit 504 may be specifically configured to separately calculate the unique device information according to a preset first algorithm to obtain calculated information, and combine the calculated information according to a preset third sequence to obtain the public key.

Alternatively, the generation unit 504 may be specifically configured to combine the unique device information according to a preset fourth sequence to obtain combined information and calculate the combined information according to a preset second algorithm to obtain the public key.

The first sequence, the second sequence, the third sequence, the fourth sequence, the preset first algorithm, the preset second algorithm, the preset extraction rule, and the like may be set according to requirements of actual application, and details are not further described herein.

It should be noted that the policy used during the decryption should be consistent with the policy selected during the encryption.

(5) The Decryption Unit 505

The decryption unit 505 is configured to decrypt the ciphertext by using the public key to obtain original data.

For example, the decryption unit 505 may be specifically configured to obtain ciphertext from target storage devices according to a data encryption request and then, decrypt the ciphertext by using the public key to obtain original data, and for example, invoke a decryption process, execute the encryption process, and then, decrypt the ciphertext by using the public key to obtain original data.

Optionally, to improve security, after the ciphertext is decrypted by using the public key, relevant data of the public key may be locally destructed. The relevant data of the public key is relevant information of the public key that may be leaked such as the public key and the unique device information used for generating the public key. That is, the data decryption apparatus may further include a destruction unit as follows:

the destruction unit is configured to locally destruct relevant data of the public key, for example, locally delete the obtained unique device information (that is, the unique device information used for generating the public key).

The data encryption apparatus may be integrated in various devices such as a terminal, a server, or another network device.

During specific implementation, the foregoing units may be implemented as independent entities or may be randomly combined to be implemented as one or several entities. For specific implementations of the foregoing units, refer to the foregoing method embodiments. Details are not described herein again.

It could be known from the above that the embodiments of the present application adopts a solution, in which when a data decryption request is received, the determining unit 502 determines target storage devices that store the ciphertext, where the ciphertext is stored in at least two target storage devices, then, the obtaining unit 503 obtains unique device information of the target storage devices, and the generation unit 504 generates, based on the unique device information, a public key according to a preset policy, and then, the decryption unit 505 decrypts the ciphertext by using the public key to obtain original data. This solution is applicable to a case in which a plurality of devices shares a piece of ciphertext, to improve applicability thereof. Moreover, because the public key is generated according to unique device information of the plurality of target storage devices, and the unique device information needs to be separately obtained from the plurality of devices, the lack of unique device information of any one of the devices causes that decryption cannot be performed. Therefore, even if one of the devices is stolen, information leakage would not be caused, so that security of data can be greatly improved.

Embodiment 6

Figure 6:
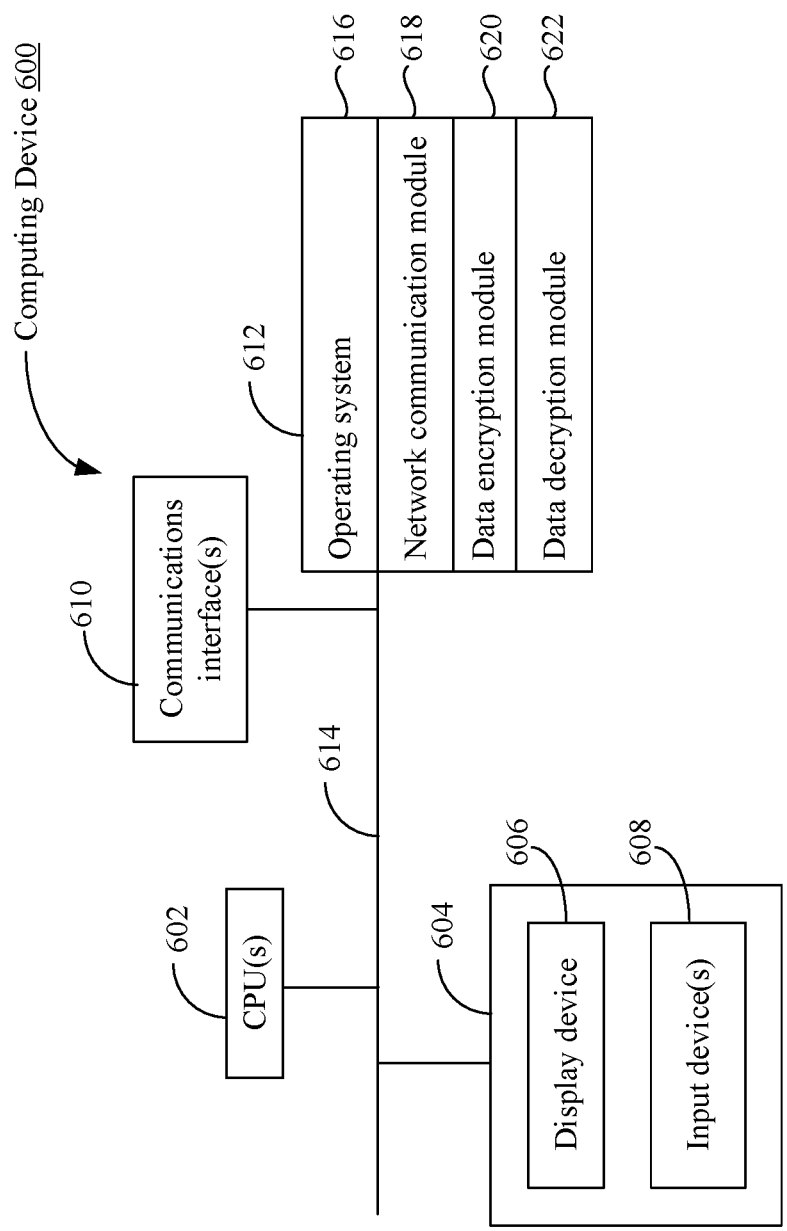
FIG. 6 is a schematic structural diagram of a computing device for data encryption and decryption according to an embodiment of the present application.

In addition, the embodiments of the present application further provide a data storage system including a computing device for data encryption and data decryption that is provided by the embodiments of the present application. FIG. 6 is a schematic structural diagram of the computing device 600 for data encryption and decryption according to an embodiment of the present application. The computing device 600 typically includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. The communication buses 614 optionally include circuitry (sometimes called a chipset) that interconnects and controls communications between system components. The computing device 600 optionally includes a user interface 604 comprising a display device 606 and one or more input device(s) (e.g., keyboard, mouse, touch-sensitive surface) 608. In some embodiments, an input device 608 is integrated with the display device 606. For example, a touch screen includes a touch-sensitive surface integrated with the display device 606. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the computing device 600 to other computers via the one or more communication network interfaces 610 (wired or wireless) and one or more communication networks, such as the Internet, other wide area networks, local area networks, metropolitan area networks, and so on;
- a data encryption module 620 for encrypting data in response to a data encryption request as described above in connection with FIG. 4; and
- a data decryption module 622 for decrypting data in response to a data decryption request as described above in connection with FIG. 5.

Refer to Embodiment 4 for the data encryption apparatus, and refer to Embodiment 5 for the data decryption apparatus. The data encryption apparatus and the data decryption apparatus may be also integrated in a same entity such as a terminal, a server, or another network device. For example, an example in which the data encryption apparatus and the data decryption apparatus are both integrated in a same network device is used and may be specifically as follows:

The network device is configured to receive a data encryption request, the data encryption request indicating original data that needs to be encrypted and at least two target storage devices; separately obtain unique device information of the at least two target storage devices; generate, based on the unique device information, a public key according to a preset policy; and encrypt the original data by using the public key to obtain ciphertext; and locally destruct relevant data of the public key, and store the ciphertext into the at least two target storage devices.

The network device may be further configured to receive a data decryption request, the decryption request indicating ciphertext that needs to be decrypted; determine target storage devices that store the ciphertext, the ciphertext being stored in at least two target storage devices; obtain unique device information of the target storage devices; generate, based on the unique device information, a public key according to a preset policy; and decrypt the ciphertext by using the public key to obtain original data.

In addition, the data storage system may further include at least two storage devices, where each storage device may implement the foregoing functions.

The storage device is configured to provide unique device information to the network device, receive ciphertext sent by the network device, and store the ciphertext.

The storage device may be further configured to send the ciphertext to the network device.

For specific implementations of the foregoing devices, refer to the foregoing embodiments. Details are not described herein again.

Because the data storage system may include any data encryption apparatus and any data decryption apparatus that are provided in the embodiments of the present application, beneficial effects of any data encryption apparatus and any data decryption apparatus that are provided in the embodiments may be produced. For details, refer to the foregoing embodiments. Details are not described herein again.

Persons of ordinary skill in the art may understand that all or some of the steps in the various methods of foregoing embodiments may be implemented by a program instructing relevant hardware. The program may be stored in a computer readable storage medium. The storage medium may be a Read Only Memory (ROM), a Random Access Memory (RAM), a magnetic disk, an optical disc, or the like.

A data encryption method, a decryption method, an apparatus, and a system according to embodiments of the present application are described in detail above. The principle and implementation of the present disclosure are described herein through specific examples. The description about the embodiments of the present application is merely provided for ease of understanding of the method and core ideas of the present disclosure. Meanwhile, persons skilled in the art can make variations to the present disclosure in terms of the specific implementations and application scopes according to the ideas of the present disclosure. Therefore, the content of the specification shall not be construed as a limit to the present disclosure.

What is claimed is:

1. A data encryption method performed at a computing device having one or more processors and memory storing programs to be executed by the computing device, the method comprising:
   receiving a data encryption request, the data encryption request indicating original data that needs to be encrypted and identifiers of at least two target mobile phones for storing the encrypted data, wherein the at least two target mobile phones are communicatively connected to the computing device;
   in response to the data encryption request:
      separately obtaining unique device information of the at least two target mobile phones;
      generating, based on the unique device information of the at least two mobile phones, an encryption key that includes a combination of the unique device information of the at least two mobile phones and according to a preset policy;
      encrypting the original data by using the encryption key to obtain ciphertext, including dividing, according to a quantity of the at least two target mobile phones, the ciphertext into a corresponding quantity of ciphertext segments;
      destructing relevant data of the encryption key from the computing device; and
      storing each of the ciphertext segments into a corresponding target mobile phone of the at least two target mobile phones, such that the ciphertext can be obtained only by combining all of the ciphertext segments from the at least two target mobile phones;
   receiving a data decryption request, the decryption request indicating ciphertext that needs to be decrypted and including addresses of the at least two mobile phones that store the ciphertext to be decrypted;
   in response to the data decryption request:
      determining, based on the addresses, that the ciphertext to be decrypted are stored at the at least two target mobile phones and can be obtained by combining the ciphertext segments from the at least two target mobile phones, wherein the at least two target mobile phones are communicatively connected to the computing device via Bluetooth;
      obtaining the unique device information of the at least two target mobile phones by the Bluetooth connection;
      retrieving, based on the unique device information, the encryption key that includes the combination of the unique device information of the at least two mobile phones and according to the preset policy; and
      retrieving the ciphertext by combining the cipertext segments from the at least two target mobile phones and decrypting the ciphertext by using the encryption key to obtain decrypted data.

2. The method according to claim 1, wherein the preset policy for generating the encryption key comprises one of the following:
   combining the unique device information according to a preset first sequence to obtain the encryption key;
   separately extracting a portion of the unique device information according to a preset extraction rule to obtain extracted information, and combining the extracted information according to a preset second sequence to obtain the encryption key;
   separately calculating a portion of the unique device information according to a preset first algorithm to obtain calculated information, and combining the calculated information according to a preset third sequence to obtain the encryption key; and
   combining the unique device information according to a preset fourth sequence to obtain combined information and calculating a portion of the combined information according to a preset second algorithm to obtain the encryption key.

3. The method according to claim 1, wherein the operation of separately obtaining unique device information of the at least two target mobile phones comprises:
   separately sending a first device information obtaining request to the at least two target mobile phones; and
   separately receiving the unique device information returned by the at least two target mobile phones according to the first device information obtaining request.

4. The method according to claim 1, wherein the operation of separately obtaining unique device information of the at least two target mobile phones comprises:
   separately sending a second device information obtaining request to the at least two target mobile phones, wherein the second device information obtaining request carries authentication information; and
   separately receiving the unique device information returned by the at least two target mobile phones, wherein the unique device information is returned by the at least two target mobile phones after the at least two target mobile phones perform authentication on the second device information obtaining request according to the authentication information and determine that the authentication succeeds.

5. The method according to claim 1, wherein the operation of destructing relevant data of the encryption key comprises:
   deleting the obtained unique device information from the computing device.

6. The method according to claim 1, further comprising:
   storing an entire copy of the ciphertext at each of the at least two target mobile phones.

7. The method according to claim 1, further comprising:
   locally destructing relevant data of the public key after decrypting the ciphertext by using the encryption key.

8. A computing device for data encryption and data decryption, comprising:
one or more processors;
memory; and
a plurality of programs stored in the memory, wherein the plurality of programs, when executed by the one or more processors, cause the computing device to perform the following operations:
receiving a data encryption request, the data encryption request indicating original data that needs to be encrypted and identifiers of at least two target mobile phones for storing the encrypted data, wherein the at least two target mobile phones are communicatively connected to the computing device;
in response to the data encryption request:
separately obtaining unique device information of the at least two target mobile phones;
generating, based on the unique device information of the at least two mobile phones, an encryption key that includes a combination of the unique device information of the at least two mobile phones and according to a preset policy;
encrypting the original data by using the encryption key to obtain ciphertext, including dividing, according to a quantity of the at least two target mobile phones, the ciphertext into a corresponding quantity of ciphertext segments;
destructing relevant data of the encryption key from the computing device; and
storing each of the ciphertext segments into a corresponding target mobile phone of the at least two target mobile phones, such that the ciphertext can be obtained only by combining all of the ciphertext segments from the at least two target mobile phones;
receiving a data decryption request, the decryption request indicating ciphertext that needs to be decrypted and including addresses of the at least two mobile phones that store the ciphertext to be decrypted;
in response to the data decryption request:
determining, based on the addresses, that the ciphertext to be decrypted are stored at the at least two target mobile phones and can be obtained by combining the ciphertext segments from the at least two target mobile phones, wherein the at least two target mobile phones are communicatively connected to the computing device via Bluetooth;
obtaining the unique device information of the at least two target mobile phones by the Bluetooth connection;
retrieving, based on the unique device information, the encryption key that includes the combination of the unique device information of the at least two mobile phones and according to the preset policy; and retrieving the ciphertext by combining the cipertext segments from the at least two target mobile phones and decrypting the ciphertext by using the encryption key to obtain decrypted data.

9. The computing device according to claim 8, wherein the preset policy for generating the encryption key comprises one of the following:
combining the unique device information according to a preset first sequence to obtain the encryption key;
separately extracting a portion of the unique device information according to a preset extraction rule to obtain extracted information, and combining the extracted information according to a preset second sequence to obtain the encryption key;
separately calculating a portion of the unique device information according to a preset first algorithm to obtain calculated information, and combining the calculated information according to a preset third sequence to obtain the encryption key; and
combining the unique device information according to a preset fourth sequence to obtain combined information and calculating a portion of the combined information according to a preset second algorithm to obtain the encryption key.

10. The computing device according to claim 8, wherein the operation of separately obtaining unique device information of the at least two target mobile phones comprises:
separately sending a first device information obtaining request to the at least two target mobile phones; and
separately receiving the unique device information returned by the at least two target mobile phones according to the first device information obtaining request.

11. The computing device according to claim 8, wherein the operation of separately obtaining unique device information of the at least two target mobile phones comprises:
separately sending a second device information obtaining request to the at least two target mobile phones, wherein the second device information obtaining request carries authentication information; and
separately receiving the unique device information returned by the at least two target mobile phones, wherein the unique device information is returned by the at least two target mobile phones after the at least two target mobile phones perform authentication on the second device information obtaining request according to the authentication information and determine that the authentication succeeds.

12. The computing device according to claim 8, wherein the operation of destructing relevant data of the encryption key comprises:
deleting the obtained unique device information from the computing device.

13. The computing device according to claim 8, the operations further comprising:
storing an entire copy of the ciphertext at each of the at least two target mobile phones.

* * * * *